(No Model.) 2 Sheets—Sheet 1.

W. W. McKEE.
CAR TRUCK.

No. 536,539. Patented Mar. 26, 1895.

WITNESSES
R. Schleicher
Will. A. Barr

INVENTOR
William W. McKee
By his Attorneys
Howson & Howson (No Model.) 2 Sheets—Sheet 2.

W. W. McKEE.
CAR TRUCK.

No. 536,539. Patented Mar. 26, 1895.

WITNESSES
R. Schleicher
Will. A. Barr

INVENTOR
William W. McKee
By his Attorneys
Howson & Howson

UNITED STATES PATENT OFFICE.

WILLIAM W. McKEE, OF CATASAUQUA, PENNSYLVANIA, ASSIGNOR OF TWO-THIRDS TO JAMES W. FULLER AND THOMAS BRAGG, OF SAME PLACE.

CAR-TRUCK.

SPECIFICATION forming part of Letters Patent No. 536,539, dated March 26, 1895.

Application filed May 25, 1894. Serial No. 512,420. (No model.)

*To all whom it may concern:*

Be it known that I, WILLIAM W. McKEE, a citizen of the United States, and a resident of Catasauqua, Lehigh county, Pennsylvania, have invented certain Improvements in Car-Trucks, of which the following is a specification.

My invention relates to certain improvements in the construction of motor car trucks especially adapted for electric railway purposes.

The main object of my invention is to so construct a four wheeled truck that it can be readily removed from under the car body and will support the motors independently of the car body.

A further object of my invention is to so gear the forward and rear trucks that the car will readily turn curves without undue binding.

My improved truck may be termed a double four wheeled truck, it having two truck frames each carrying an axle.

Figure 2:
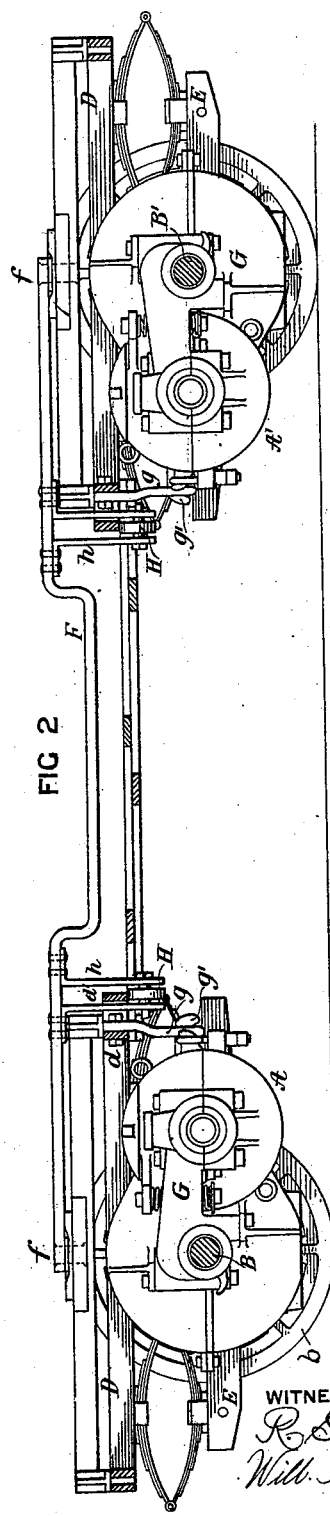
Figure 1:
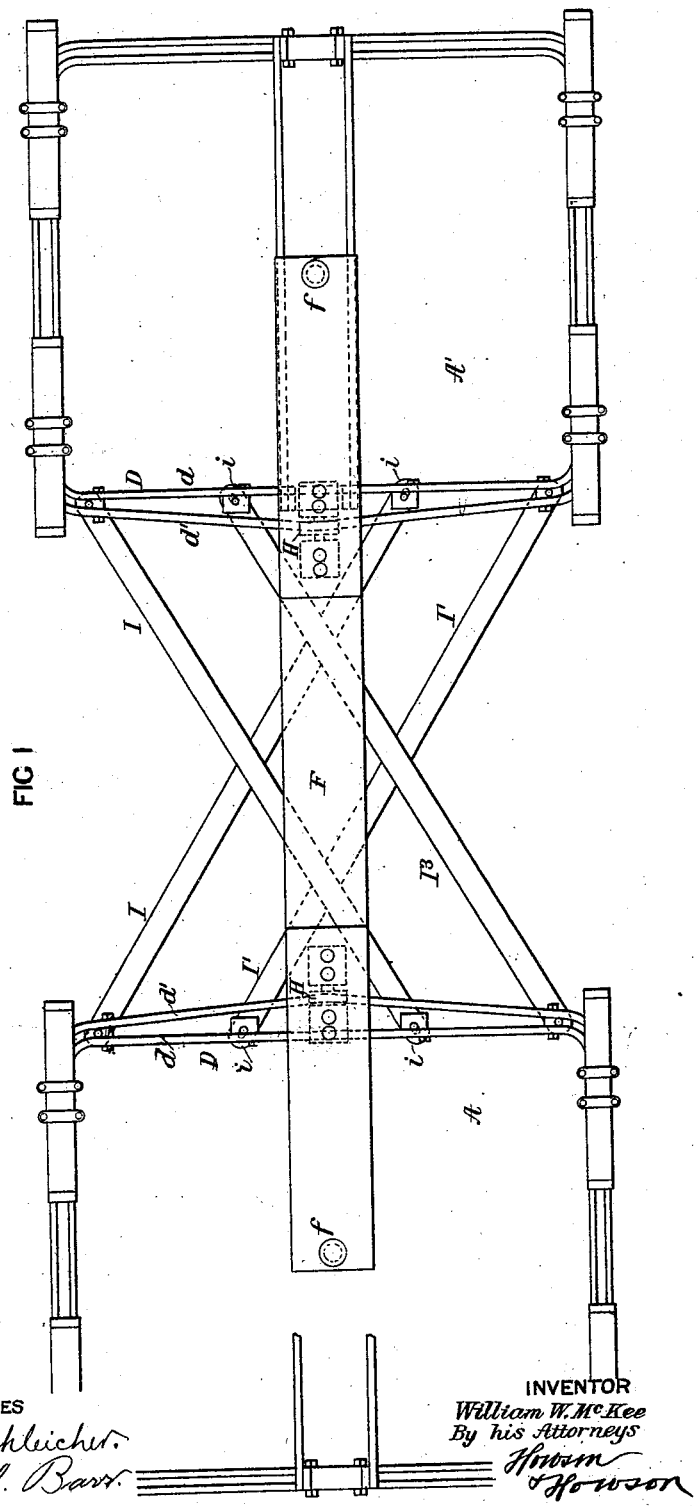
Figure 3:
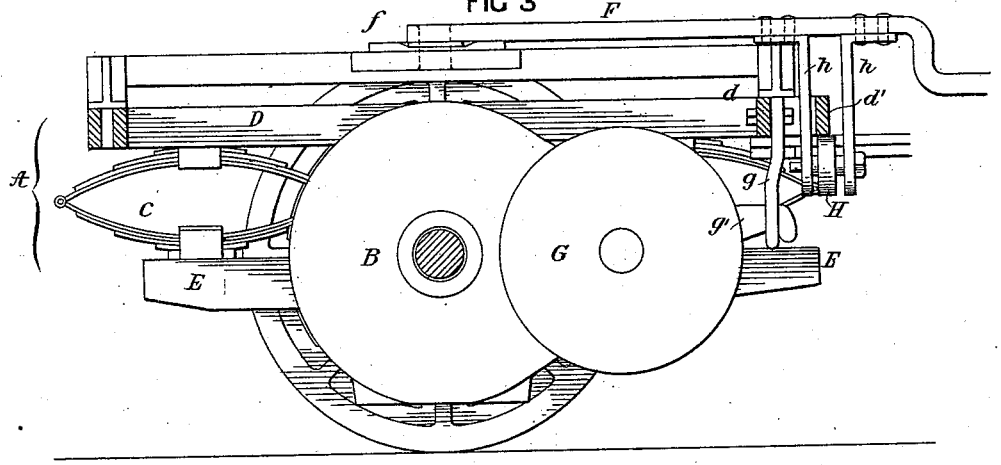
Figure 4:
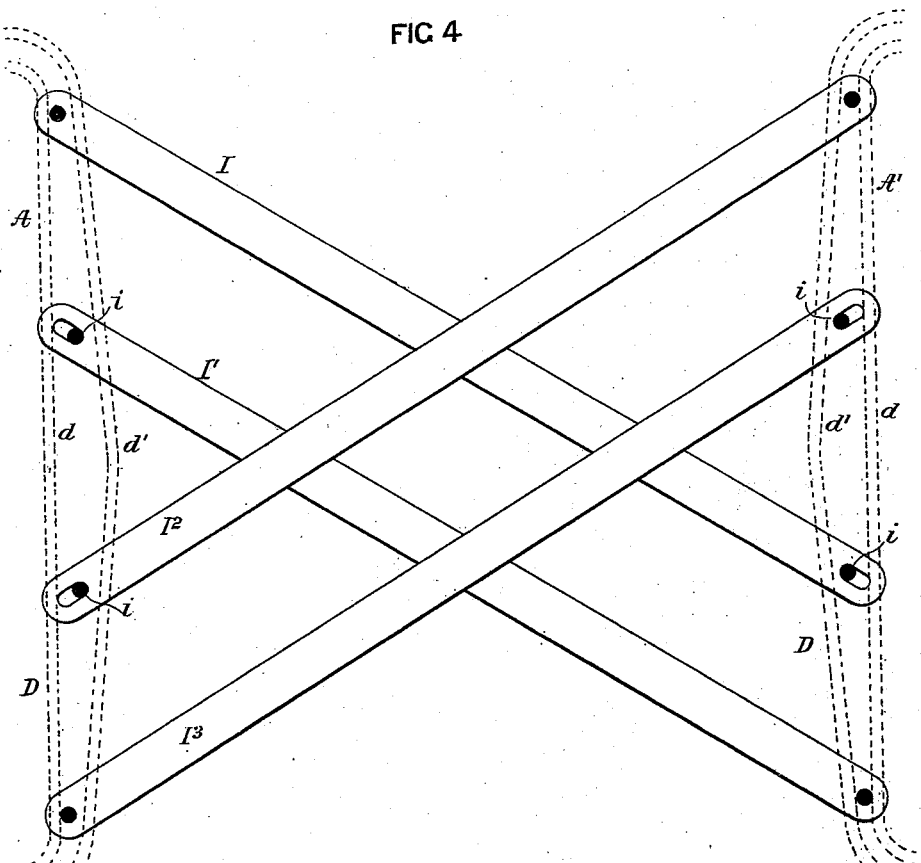

In the accompanying drawings: Figure 1, is a plan view of sufficient of the car truck to illustrate my invention. Fig. 2, is a longitudinal sectional view. Fig. 3, is an enlarged longitudinal sectional view of one end of the truck showing one truck frame. Fig. 4, is a diagram view.

A is the forward truck frame and A' the rear truck frame. Mounted in suitable pedestals in the truck frame A is the axle B having wheels $bb$. The truck frame consists of the upper portion D and lower portion E. Between the two portions are placed elliptic springs $c$. The two truck frames A and B are connected together by a running plate which is pivoted to the truck frames by the king bolts $ff$ so that each truck frame is free to swivel on the plate. This plate F may be depressed in the middle, as shown, or may be shaped in any manner desired and while I prefer to make it of channel iron it can be made of any iron or steel shape or may be made of wood where such construction is available.

The upper portion D of each truck frame in the present instance, is made of iron and consists of two bars $d\ d'$ and attached to the bar $d$ is a hanger $g$ which supports the inner end of the motor G, as clearly shown in Fig. 3. In the present instance this motor has a slotted extension $g'$ which passes through each opening in the hanger, but other means of fastening the motor to the truck frame may be devised without departing from my invention.

$h\ h$ are hangers carrying the roller or wheel H. This wheel rests directly under the bar $d'$ of the upper frame D so that the weight of the motor is taken by the longitudinal tie plate F through the medium of the roller so that it will be impossible for the inner end of the motor to drop when the truck is removed from the car body. The frame moves on the roller when the truck is passing around a curve.

Two rollers may be substituted for the single roller shown where the weight of the motor requires, but I find that a single roller will answer the purpose in most cases.

The mechanism of the truck frame A is duplicated on the truck frame A' so that it is unnecessary to go into detailed description of the mechanism of this truck.

It will be seen that the car body can be readily removed from the truck and the parts will remain intact.

While the two truck frames are pivoted to the running plate by the king bolts $ff$ they are also connected together by diagonal rods arranged in one or more sets crossing each other at the center as indicated in Fig. 1. The bars I, I³ are rigidly connected to the truck frame A while the bars I², I' are connected rigidly to the truck frame A', but the bars I and I³ are slotted in the present instance at their outer ends and are loosely connected to the truck frame A' and the bars I² and I' are also slotted and connected to the truck frame A so that there will be a certain amount of lost motion when the car takes a curve.

The slots are so formed, as shown in Fig. 4, that the truck frame first taking the curve will be prevented from falling back by the pins $i\ i$ in the slots. Consequently the outer side of the truck frame will move forward and accommodate itself to the curve as the slots allow for this movement. When the rear truck frame takes the curve it will fall back, the slotted bar allowing it to have sufficient movement to pass around the curve without undue friction.

While I have shown two sets of connecting bars it will be understood that one set may be used or more than two sets may be used without departing from my invention and that while I have shown the bars connected to the upper portions of the truck frame they may be connected to the lower portions E, and the blocks may be loose on the truck frame or the frame may yield sufficiently to allow the bars to act without being slotted so as to move the outer side of the forward truck frame forward and to allow the outer side of the rear truck frame to fall back without drawing together the inner sides of the truck frames. Thus it will be seen by my invention that I am enabled to make a four wheeled truck consisting of two two-wheeled truck frames connected together by a running plate through the medium of king bolts and by connecting bars connecting the inner ends of the truck frames. A truck made in this manner is self-sustaining as the inner ends of the trucks are supported on the rollers carried by the running plate and an overbalance motor can be readily hung to the truck without danger of tipping and the truck can be readily removed from under a car so that access may be had to all parts of the truck.

I claim as my invention—

1. The combination in a four wheeled motor car truck consisting essentially of two truck frames, an axle mounted in each frame, a running plate extending from one truck frame to the other, an overbalanced motor carried on one axle and suspended from the inner end of its truck frame, with a supporter for the inner end of said truck frame carried by the running plate, substantially as described.

2. The combination of the two truck frames, a running plate connecting the two frames, an overbalance motor carried on the axle of each truck frame and suspended from the inner end of each truck frame with a supporter for the inner end of each truck frame carried by the running plate, substantially as described.

3. The combination of the two truck frames A A', a running plate connecting the two truck frames, rollers carried by the running plate and supporting the inner end of each truck frame, with an overhanging motor mounted on the axle of each frame and suspended from the inner end of the truck frame, substantially as described.

4. The combination of two truck frames with the two sets of diagonal connection bars, one end of each bar being rigidly connected to one truck frame and the other end of the bar being loosely connected so as to allow the outer sides of the truck frame to separate in rounding a curve, and stops to prevent the inner sides of the truck frames coming toward each other, substantially as described.

5. The combination of the two truck frames A A', their axles and wheels, a running plate pivoted to each truck frame, the diagonal bars connecting the inner ends of the truck frames with stops which prevent the inner sides of the truck frames coming together but which allow the outer sides of the trucks to separate, substantially as described.

6. The combination of the truck frames A, A', the longitudinal bars rigidly connected at one end to the truck frames and slotted at their opposite ends and pins adapted to the slots, the pins, when the truck rounds a curve, preventing the inner sides of the truck frames coming together but allowing the outer sides of the trucks to separate, substantially as described.

7. The combination of the two truck frames A, A', the portion B having bars $d\ d'$, a supporting roller H upon which the bar $d'$ rests, hangers $h\ h'$ for said roller, an overhanging motor suspended from the inner end of each truck frame and a running bar F to which the hangers are secured, said running bar F being pivoted to the truck frames, substantially as described.

In testimony whereof I have signed my name to this specification in the presence of two subscribing witnesses.

WILLIAM W. McKEE.

Witnesses:
H. J. HORNBECK,
E. H. KINNEY.